F. R. MORRELL.
FILTER OR STRAINER FOR WATER JUGS, CANTEENS, AND THE LIKE.
APPLICATION FILED APR. 24, 1909.

929,153.

Patented July 27, 1909.

Witnesses
C. H. Walker
K. S. Hodges

Inventor
Frederick R. Morrell
By Henry P. Blair
Attorney

UNITED STATES PATENT OFFICE.

FREDERICK R. MORRELL, OF GREEN BAY, WISCONSIN.

FILTER OR STRAINER FOR WATER-JUGS, CANTEENS, AND THE LIKE.

No. 929,153.            Specification of Letters Patent.           Patented July 27, 1909.

Application filed April 24, 1909. Serial No. 492,018.

*To all whom it may concern:*

Be it known that I, FREDERICK R. MORRELL, citizen of the United States, residing at Green Bay, in the county of Brown and State of Wisconsin, have invented certain new and useful Improvements in Filters or Strainers for Water-Jugs, Canteens, and the Like, of which the following is a specification.

This invention relates to certain new and useful improvements in filters or strainers, and pertains more particularly to that class of such devices which is adapted to be placed in the mouth of a water jug, canteen, or the like.

The invention has for its object the production of a simple and inexpensive device adapted to be placed in the mouth of a water bottle, canteen or the like, and constructed to strain or filter the water or other liquid as it passes out of the same.

A further object is to provide a filtering device which is adapted to be placed to the mouth of the user, a suitable vent being provided, whereby the water will flow freely as the user is drinking the same.

The invention will be hereinafter fully set forth and particularly pointed out in the claims.

Figure 1:
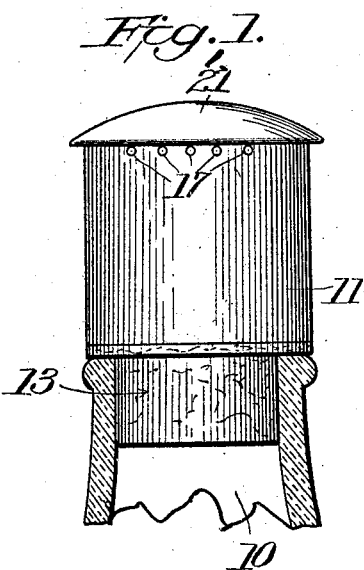
Figure 4:
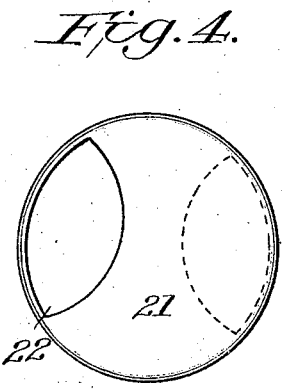
Figure 2:
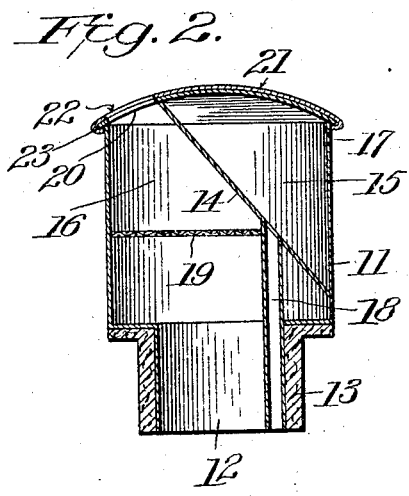
Figure 3:
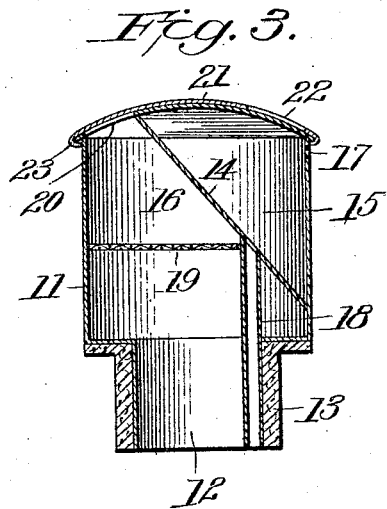

In the accompanying drawing:—Figure 1 is a side elevation illustrating my improved filter. Fig. 2 is a longitudinal sectional view illustrating the same, with the mouthpiece opened. Fig. 3 is a similar view with the mouthpiece closed. Fig. 4 is a top plan view with the mouthpiece closed.

Referring to the drawing, 10 designates the neck of a water jug, canteen or the like, and 11 indicates my improved filter, as an entirety. Said filter comprises a cylindrical body provided with a reduced portion 12 adapted to fit within the neck 10, the same being preferably surrounded by a rubber or cork washer 13 to insure an air tight and water tight closure. The filter 11 is provided with a diagonally arranged partition 14 forming an air chamber 15 and a water delivery chamber 16, said air chamber being provided with vent openings 17 and a vent tube 18, the latter leading down through the reduced portion 12 to the interior of the receptacle 10.

Extending transversely across the water delivery chamber 16 is a strainer or filter 19, and said delivery chamber is provided with an outlet opening 20 shaped to conveniently enter the mouth of a person desiring to drink the contents of the vessel 10. The top of the filter is closed by a cap 21 provided with an opening 22 adapted to register with the opening 20, said cap being provided with a flange fitting over a shoulder 23, said flange being loose enough to permit the turning of said cap.

In practice, the filter 11 is removed from the receptacle 10 and the latter filled with water in any preferred manner, after which the filter is again placed in position. When a person desires to drink from the receptacle, the cap 21 is moved to bring the openings 20 and 22 into register, whereupon the opening 20 may be placed to the mouth. The air chamber 15 provides sufficient vent to permit of a free flow of the water which is strained or filtered as it passes the screen 19. In this manner all mechanical impurities are retained in the receptacle 10.

I claim as my invention:—

1. A filter of the character described comprising a body adapted to fit in the neck of a water jug, canteen or the like, and provided with an air chamber and a water delivery chamber, a filtering screen located in said water delivery chamber, and a cap for closing said delivery chamber.

2. A filter of the character described comprising a body adapted to fit in the neck of a water jug, canteen or the like, said body being provided with an exterior shoulder, the interior of said body being divided into an air chamber and a water delivery chamber, a filtering screen located in said water delivery chamber, and a cap for closing said delivery chamber, said cap being provided with an annular flange engaging said shoulder.

3. A filter of the character described comprising a body adapted to fit in the neck of a water jug, canteen or the like, said body being provided with a diagonally arranged partition dividing the same into an air chamber and a water delivery chamber, vent openings being formed in the wall of said air chamber, a vent pipe leading from said air chamber, and a filtering screen extending transversely across said delivery chamber.

4. A filter of the character described comprising a body adapted to fit in the neck of a water jug, canteen or the like, said body being provided with an exterior shoulder, the interior of said body being divided into air and water delivery chambers, said air chamber being provided with vent openings, a vent pipe leading from said air chamber, a filtering screen extended transversely across said delivery chamber, and a cap provided with a flange fitting loosely over said shoulder, said cap being provided with an opening arranged to register with said delivery chamber.

In testimony whereof I hereunto affix my signature, in presence of two witnesses.

FREDERICK R. MORRELL.

Witnesses:
H. A. HULBERT,
ELIZA BOYLE.